United States Patent [19]
Andrew et al.

[11] Patent Number: 5,379,682
[45] Date of Patent: Jan. 10, 1995

[54] HOT WATER GENERATOR ASSEMBLY FOR COFFEEMAKER

[75] Inventors: Michael A. Andrew, Milford; Walter Birdsell, Beacon Falls; Stephen D. Mowers, Fairfield, all of Conn.

[73] Assignee: Black & Decker Inc., Newark, Del.

[21] Appl. No.: 181,122

[22] Filed: Jan. 13, 1994

[51] Int. Cl.⁶ .............................. A47J 31/00
[52] U.S. Cl. .......................... 99/281; 99/300; 392/480
[58] Field of Search ............... 99/280, 281, 282, 283, 99/295, 300; 219/520, 521; 392/479, 480

[56] References Cited

U.S. PATENT DOCUMENTS

| | | |
|---|---|---|
| 3,143,954 | 8/1964 | Nesmith . |
| 3,319,561 | 5/1967 | Bloomfield et al. . |
| 4,095,086 | 6/1978 | Ohnmacht et al. . |
| 4,141,286 | 2/1979 | Smit . |
| 4,142,840 | 3/1979 | Kemp . |
| 4,206,341 | 6/1980 | Leuschner ............. 392/480 |
| 4,303,827 | 12/1981 | Kyles . |
| 4,402,257 | 9/1983 | Marotta . |
| 4,460,819 | 6/1984 | Eugster . |
| 4,558,204 | 12/1985 | Bleckmann . |
| 4,825,042 | 4/1989 | Hauslein ............. 392/480 |
| 5,283,854 | 2/1994 | Schiebelhuth ............. 99/281 |

*Primary Examiner*—Robert W. Jenkins
*Attorney, Agent, or Firm*—Barry E. Deutsch

[57] ABSTRACT

A coffeemaker includes a housing and a water reservoir contained within the housing. A carafe is supported on a base portion of the housing. A spreader is mounted within the housing. A hot water generator has an inlet connected to the water reservoir and an outlet connected to the spreader. The hot water generator has a generally shallow V-shape. An enclosure is supported within the housing and surrounds the hot water generator. The contact area between the surfaces of the generator and the enclosure is relatively minimal. The major portion of the surfaces of the enclosure and the hot water generator are spaced from each other to form an insulating air barrier to retain the heat generated by the hot water generator within the enclosure.

5 Claims, 11 Drawing Sheets

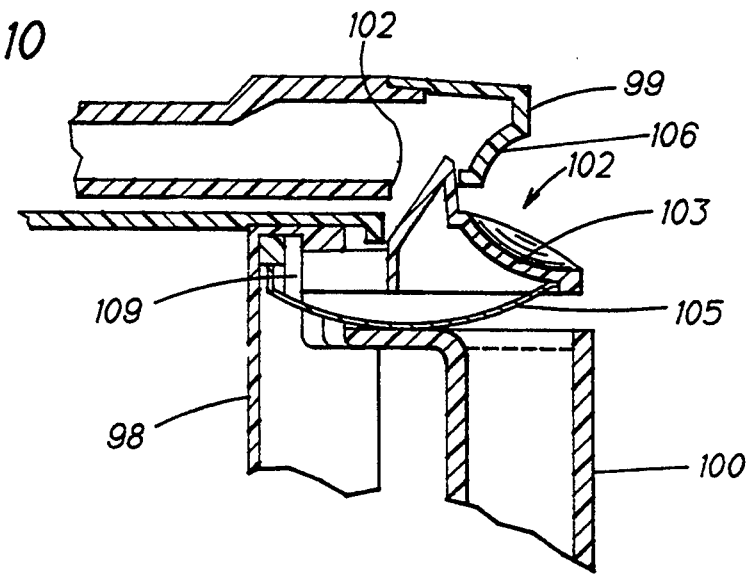
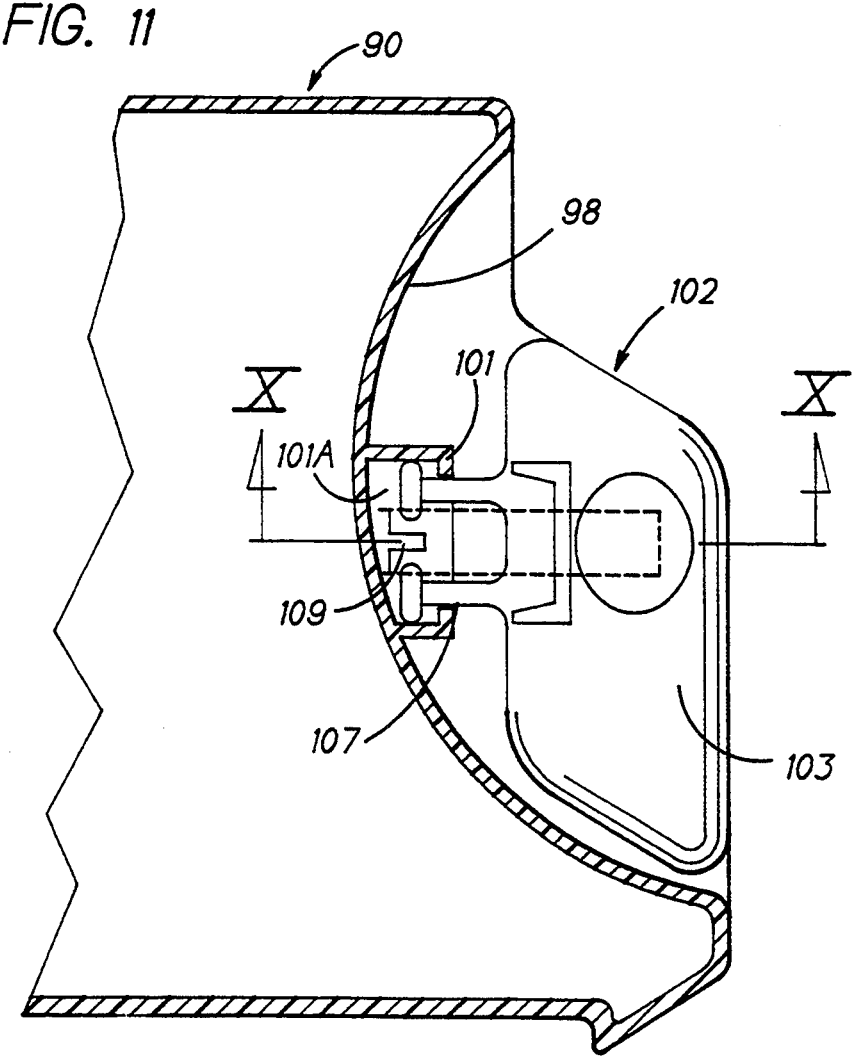

HOT WATER GENERATOR ASSEMBLY FOR COFFEEMAKER

BACKGROUND OF THE INVENTION

This invention relates to drip coffeemakers and in particular to a hot water generator assembly for the coffeemakers.

Conventional automatic drip-type coffeemakers have enjoyed widespread use and commercial acceptance. Drip coffeemakers are a very popular consumer small appliance. Such coffeemakers typically include a reservoir for containing water, a hot water generator to heat the water, a spreader for receiving the hot water and a container or basket ("brew basket") adapted to hold the coffee grind (generally in a filter) and to receive the heated water. The heated water is directed by the spreader onto the coffee grind contained in the brew basket. The brewed coffee is drained from the brew basket through an aperture located at the bottom thereof into a carafe supported on a base portion of the housing.

Many commercially available coffeemakers have a heating means associated with the carafe supporting base portion to maintain the coffee in the carafe warm for a period of time after it has been brewed. In many such coffeemakers, the same heater used to generate the hot water for brewing the coffee is also used for maintaining the coffee warm in the carafe. In other models of coffeemakers, a first heater is used to generate the hot water and a second heater is employed as a "keeps warm" heater.

Most drip-type coffeemakers employ a cycling thermostat to control the operation of the heating means for the hot water generator. Typically, the thermostat opens when it senses that the temperature of the hot water generator has reached a predetermined level and the thermostat will close when the coffeemaker is connected to a source of electrical power and the temperature of the hot water generator falls below a predetermined level.

Particularly in those coffeemakers utilizing a separate "keeps warm" heater, it is desirable that the heating means for the hot water generator be rendered inoperable for as long a period of time as possible by maintaining the thermostat open. By reducing cycling of the thermostat, the operating life of the thermostat will be extended. Further, by keeping the thermostat open for a longer period of time, the heat transferred to other parts of the coffeemaker from the hot water generator will be minimized. This will also have a positive effect on the performance and operating life of the coffeemaker.

It has also been found that many commercially available present hot water generators do not provide for consistent hot water generation. To achieve full-flavored extraction of the coffee from the coffee grind, the hot water delivered to the brew basket should be at a consistent, relatively high temperature. The temperature of the water exiting the hot water generator should exceed 200° F., but be below 212° F.

It is accordingly an object of this invention to provide a coffeemaker which is efficient in operation by providing consistent temperature hot water to the brew basket and by maintaining the thermostat associated with the heating means for the hot water generator open for relatively long periods of time.

SUMMARY OF THE INVENTION

The foregoing object and other objects of the invention are obtained in a coffeemaker comprising a housing and a water reservoir contained within the housing. A carafe is supported on a base portion of the housing. A spreader is mounted within the housing. A hot water generator has an inlet conduit connected to the water reservoir and an outlet conduit connected to the spreader. The generator has a generally shallow V-shape. In the preferred embodiment, an enclosure is supported within the housing and surrounds the hot water generator. The contact area between the surfaces of the enclosure and the hot water generator is relatively minimal. The major portion of the surfaces of the enclosure and the hot water generator are spaced from each other to form an insulating air barrier to retain the heat generated by the hot water generator within the enclosure.

BRIEF DESCRIPTION OF THE DRAWING

FIG. 10 is an enlarged sectional view taken along line of FIG. 11;

FIG. 11 is an enlarged top plan view illustrating details of the latch mechanism for the water reservoir;

DESCRIPTION OF THE PREFERRED EMBODIMENTS

Figure 1:
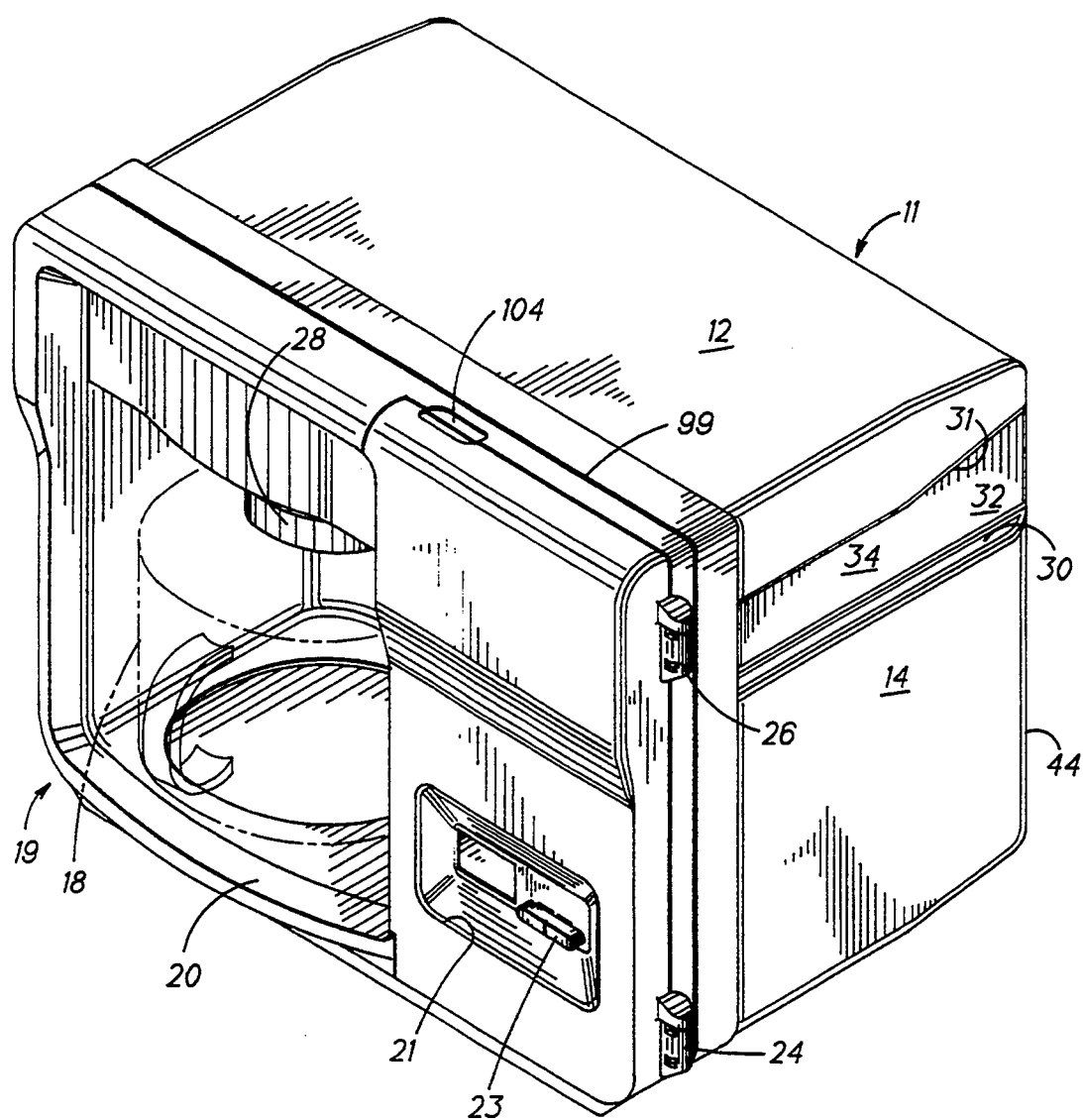
FIG. 1 is a front, top and right side perspective view of a coffeemaker embodying the present invention.

Referring now to the various figures of the drawing, there is disclosed preferred embodiments of a coffeemaker embodying the present invention. In referring to the various figures of the drawing, like numerals shall refer to like parts.

Figure 2:
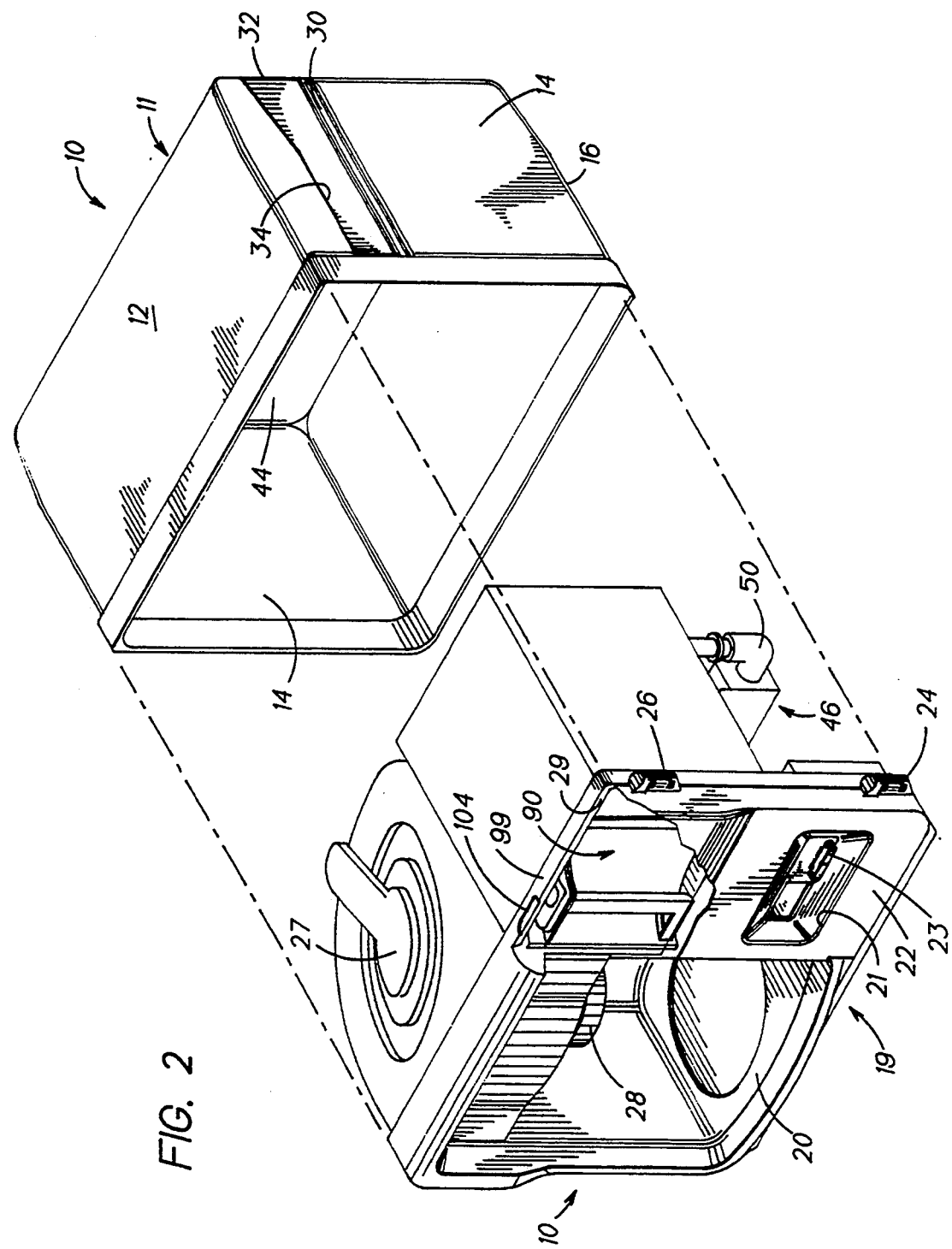
FIG. 2 is an exploded, partially broken away perspective view showing details of the coffeemaker when viewed from the front.
Figure 3:
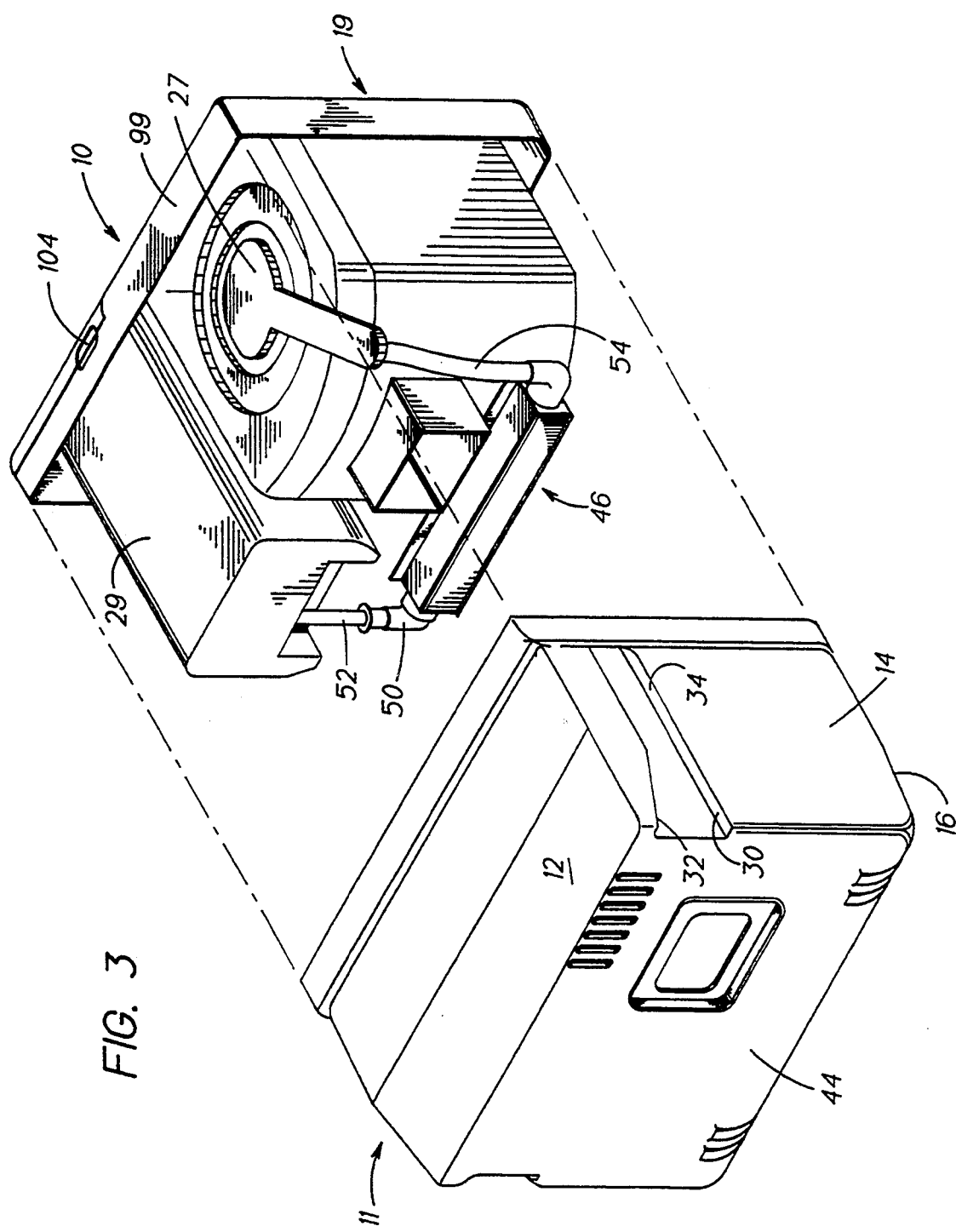
FIG. 3 is an exploded perspective view showing details of the coffeemaker when viewed from the rear.

Referring specifically to FIGS. 1, 2 and 3 there is shown a coffeemaker 10 particularly suitable for mounting under a kitchen cabinet or the like in a manner that shall be more fully explained hereinafter. Coffeemaker 10 includes an outer housing 11 comprising a top wall 12, side walls 14 and bottom wall 16 and a rear wall 44.

Each of the side walls 14 include a generally horizontally extending channel 30. Channel 30 is somewhat tapered so that its leading end 32 is wider than its trailing end 34.

Housing 11 is generally rectangularly shaped and includes an open front face which telescopically receives an inner housing and support structure 19 for coffeemaker 10. Coffeemaker 10 is a generally conventional automatic drip-type coffeemaker which has enjoyed widespread use and commercial acceptance. Coffeemaker 10 typically includes a reservoir 90 (illustrated in FIGS. 8 and 9) for containing water, a hot water generator 46 to heat the water, a spreader 27 for receiving the hot water and a container or basket 28 (generally referred to as a "brew basket") adapted to hold the coffee grind (generally in a filter) and to receive the heated water. The heated water is directed by the spreader onto the coffee grinds contained in the brew basket. The brewed coffee is drained from the brew basket through an aperture located at the bottom thereof into a carafe 18 (shown in phantom in FIG. 1) supported on base portion 20 of coffeemaker 10. Other than as shall be more fully explained hereinafter, the components of coffeemaker 10 are conventional.

Figure 8:
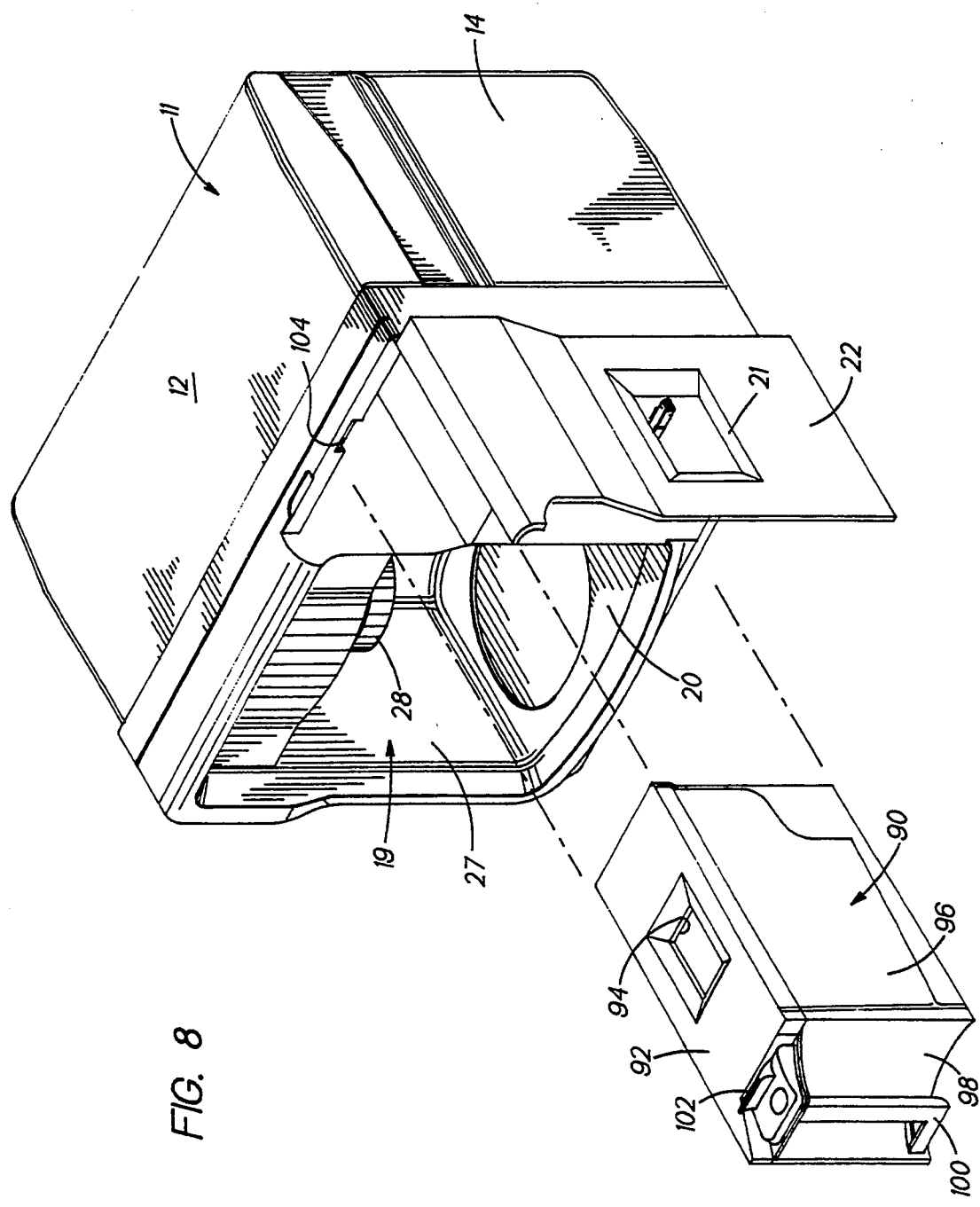
FIG. 8 is a perspective view, somewhat similar to the view of FIG. 1, illustrating the removable water reservoir of the coffeemaker.

Inner housing 19 includes a door 22. Door 22 is pivotally attached to supports 24 and 26 which are integrally formed with inner housing 19. Door 22 includes a generally rectangularly shaped opening 21 through which control knobs or buttons, such as start button 23, may be accessed by the user. Reservoir 90 is mounted in coffeemaker 19 behind door 22 when door 22 is in its closed position as illustrated in FIGS. 1 and 2. When the door is moved to an open position as illustrated in FIG. 8, reservoir 90 can be either removed from or moved into compartment 29 formed in inner housing 19.

Figure 4:
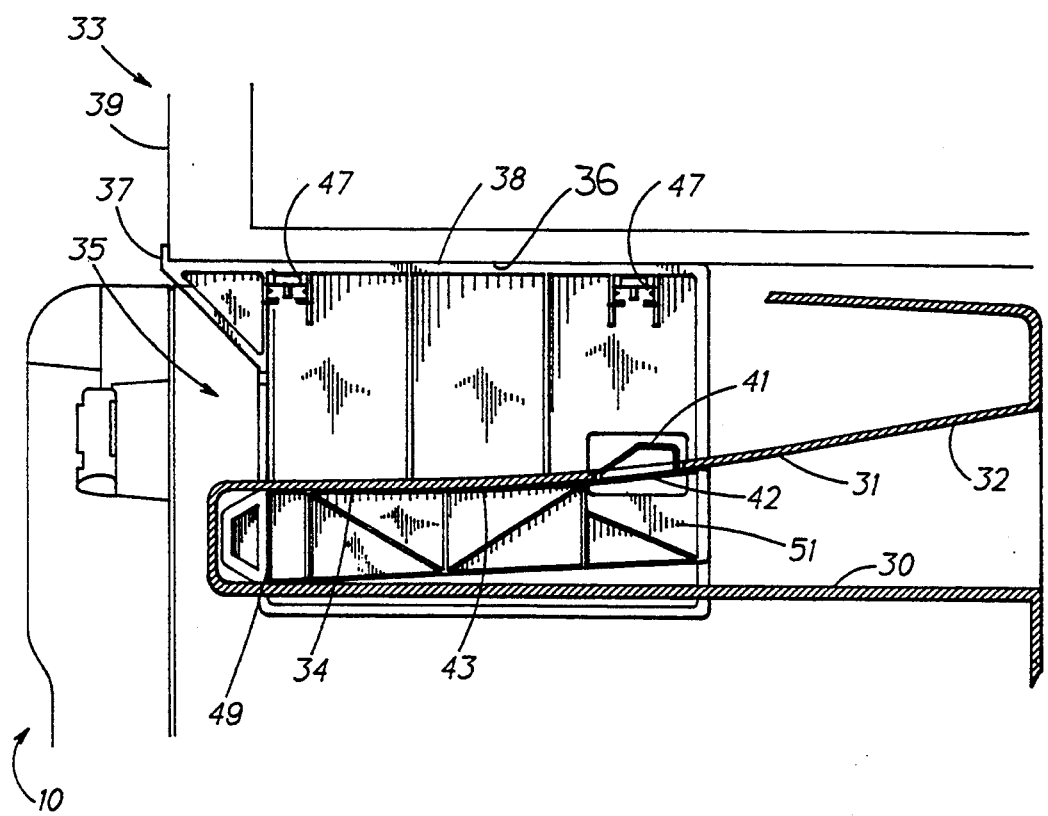
FIG. 4 is a side elevational view, partially in section, illustrating the manner in which the coffeemaker is suspended from the lower surface of a cabinet.
Figure 5:
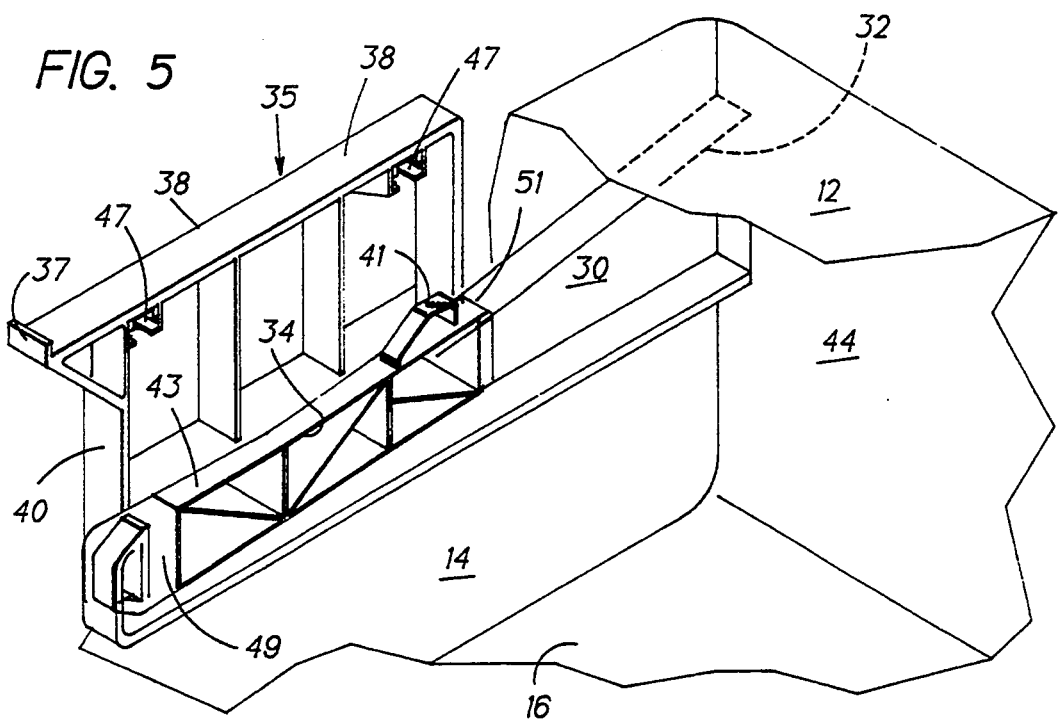
FIG. 5 is a fragmentary perspective view of the arrangement for suspending the coffeemaker from the cabinet.

Referring now to FIGS. 1, 4 and 5, the mounting arrangement for coffeemaker 10 shall now be more fully described. Side walls 14 of outer housing 11 include a horizontally extending channel 30. Channel 30 has a leading end 32 and a trailing end 34. The width of leading end 32 is somewhat greater than the width of trailing end 34. As shown specifically in FIG. 4, the upper wall 31 defining channel 30 has an opening 42 formed therethrough for a reason to be more fully explained hereinafter.

Coffeemaker 10 is designed for mounting beneath the lower surface 36 of a kitchen cabinet 33. Mounting bracket 35 is preferably employed to suspend coffeemaker 10 from kitchen cabinet 33. Bracket 35 includes a main support frame 40. Support frame 40 includes a horizontally extending rib 38 defining the upper face of bracket 35. A finger 37 extends upwardly from the trailing end of rib 38. As illustrated in FIG. 4, the upper face of rib 38 lies generally flush with the bottom surface of the lower surface 36 of kitchen cabinet 33. Similarly, finger 37 lies flush with the front surface 39 of cabinet 33.

Bracket 35 includes a rail member 43 which extends into channel 30. Rail member 43 includes an upwardly extending latch member 41 which is intended for alignment with and insertion into opening 42 of upper wall 31 defining channel 30. Channel 30 is tapered to permit rail 43 of bracket 35 to be readily inserted into the channel. The leading end 49 of rail 43 is somewhat smaller in width than the trailing end 51. Leading end 49 is first inserted into the leading end 32 of channel 30 and housing 11 is then moved relative to the rail to align latch member 41 with opening 42. When so aligned, finger 37 is flush with front surface 39 of cabinet 33. The coffeemaker is then anchored in place relative to cabinet 33. Bracket 35 in combination with channel 30 prevents unintended fore and aft movement, and unintended vertical upward or vertical downward movement of the coffeemaker relative to the cabinet. The interlocking relationship between bracket leading end 49 and the enclosed end of housing channel 30, together with the interlocking relationship between latch member 41 and housing opening 42 prevent any relative lateral movement between bracket 35 and housing 11.

Figure 6:
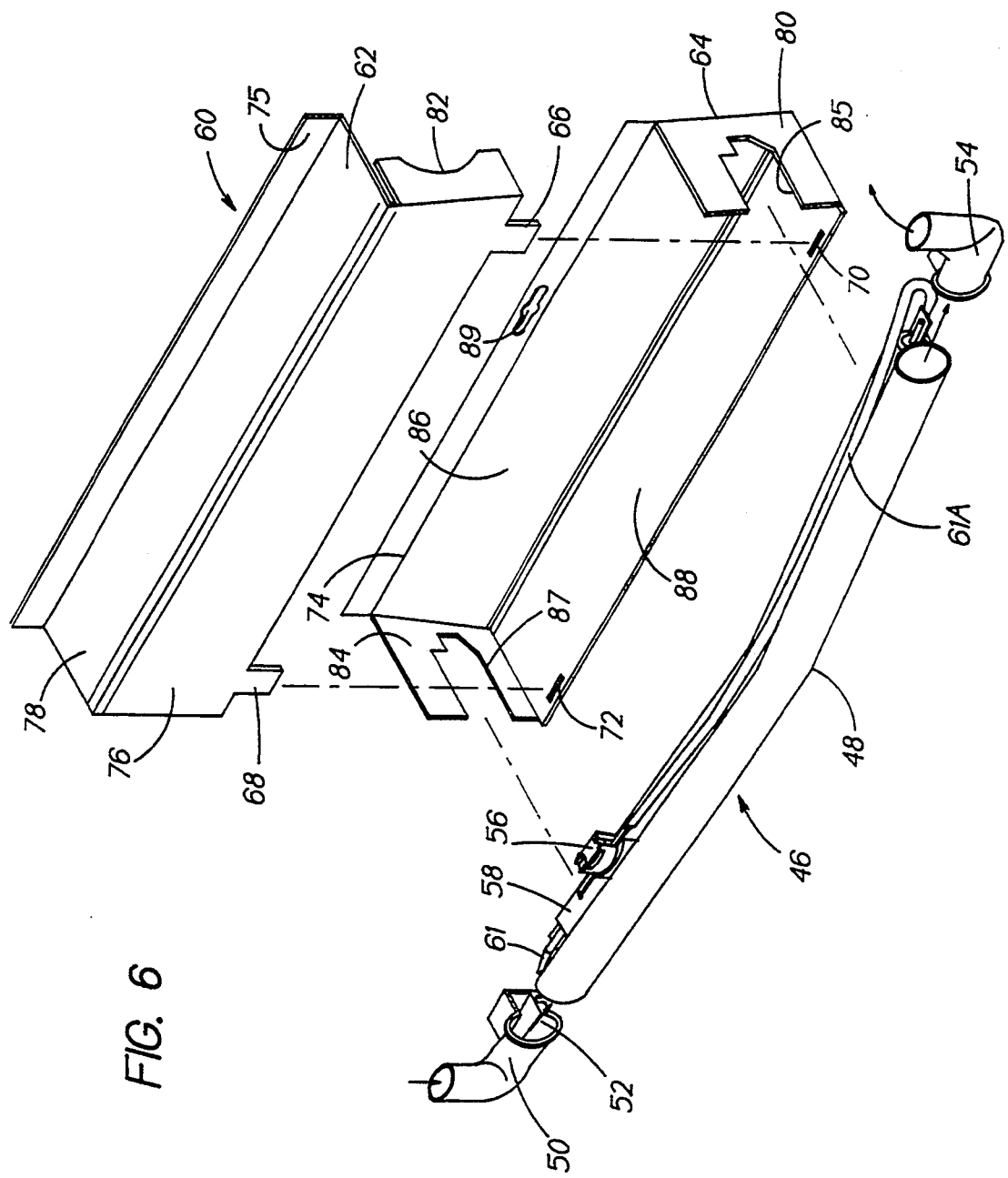
FIG. 6 is an exploded perspective view of the hot water generator and enclosure therefor employed in the coffeemaker.
Figure 7:
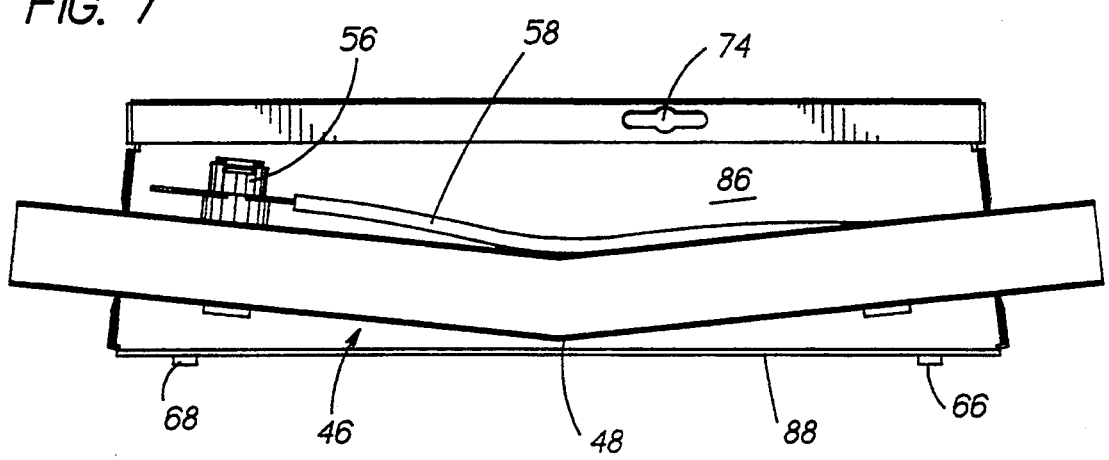
FIG. 7 is an elevational view further illustrating the hot water generator and its enclosure.

Referring now to FIGS. 6 and 7, there is disclosed a preferred embodiment of hot water generator 46 employed with coffeemaker 10. It should be understood, however, that hot water generator 46 may be used with coffeemakers of other designs.

Figure 9:
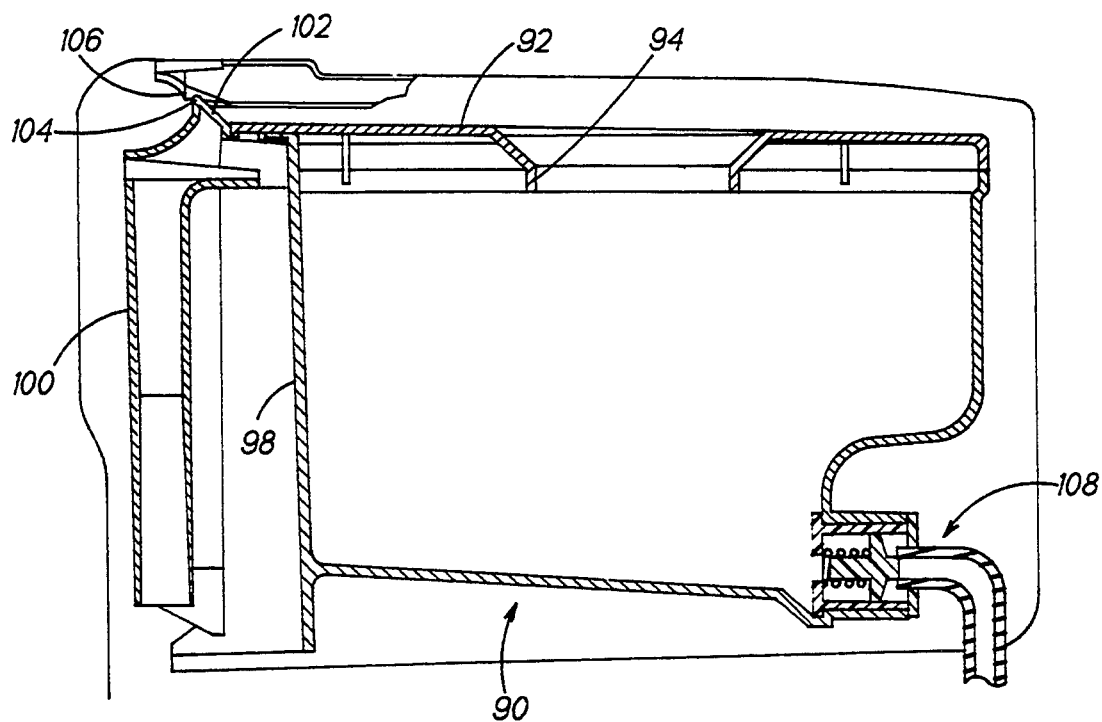
FIG. 9 is a side elevational view in section, illustrating the water reservoir mounted in the coffeemaker housing.

Hot water generator 46, as shown in FIGS. 3 and 6, is generally mounted at the rear of inner housing 19 in a generally horizontal plane. Generator 46 includes an inlet conduit 52 having an elastomeric coupling or elbow 50 formed therearound. Inlet conduit 52 is in communication with outlet 108 from water reservoir 90 as shown in FIG. 9. Generator 46 further includes a relatively shallow V-shaped metallic tube 48 through which water flows from inlet 52 to an outlet 54. Outlet 54 is in communication with the inlet to spreader 27.

Hot water generator 46 further includes an axially extending electric resistance heater 58. Heater 58 includes a thermostat 56 which senses the temperature developed within tube 48 of generator 46 and opens when the temperature exceeds a predetermined level. Electrical wires 61 and 61A connect heater 58 to a suitable source of electrical power. It has been found that by shaping hot water generator tube 48 in a shallow V-shape, the temperature of the hot water delivered from generator tube 48 will be substantially consistent which, in turn, results in the brewed coffee having a consistent taste from one brewing cycle to the next.

Pump style hot water generators, such as generator tube 48 use the action of expansion and contraction of the generated steam in combination with the check valve in the outlet 108 from reservoir 90 to move heated water to the generator outlet 54 and spreader 27. The shallow "V" shaped generator tube 48 of the present invention uniquely takes advantage of the inherent characteristics of the generated steam to obtain substantially consistent high temperature water for brewing purposes.

Generally, in hot water generators employed in pump-type coffeemakers, the majority of water heating occurs by initial localized boiling, then the bulk of the water is heated by exposure to and condensing of circulating steam pockets. As steam is less dense than water, some control of the migration of the steam pockets formed in generator tube 48 is possible.

Steam pockets formed in relatively cool water will quickly cool to boiling temperature and violently collapse as they condense (change from a vaporous to liquid state). The violent collapse of the pockets will cause water to quickly flow from the direction of least hydraulic resistance to fill the void formed by the collapsed pockets. Steam pockets formed in relatively hot water will cool slowly while moving where buoyant forces direct them. If given sufficient time, these latter pockets will also condense.

"V" shaped generator tube 48 directs the steam pockets towards the two extreme ends of the heated tube.

The major heat transfer between resistance heater 58 and tube 48 occurs towards the center of the tube.

Steam migrating towards outlet 54 which contains freshly heated water is likely to remain in its vaporous state for a substantial portion of its passage to spreader 27. This provides a subtle force to move the water towards the spreader and a moving supply of heat should the temperature of the water cool much below 212° F. The more steam that is directed with the water to spreader 27, the closer the temperature of the water will be maintained near 212° F.

Steam pockets migrating towards inlet 52 whereat the temperature of the water is significantly colder, will condense more rapidly and the pockets will abruptly collapse. The voids left by the collapsed pockets will attempt to draw water from both ends of tube 48.

If a majority portion of the water flowing towards the voids comes from reservoir 90, the temperature of the water in tube 48 tends to be colder and the pockets will collapse near the center of the tube. Conversely, if the temperature of the water in tube 48 is relatively warm, the steam pockets will migrate towards inlet 52 before collapsing. Thus, if the temperature of the water in tube 48 increases, the water flow from reservoir 90 will increase as the voids will be closer to inlet 52. In essence, by shaping tube 48 in a shallow V-shape, steam pockets will flow towards both inlet 52 and outlet 54 to provide a relatively high temperature water supply to spreader 27 at a smooth flow rate and with inherent self temperature regulation. Some design variations in the temperature of the water delivered to spreader 27 can be made by tailoring the lengths and the slopes of the legs of the "V."

Tube 48 is housed in an enclosure 60 which is generally rectangularly shaped. Enclosure 60 comprises a first member 62 and a second member 64. Member 62 includes a first vertically extending section 76 and a second horizontally extending section 78. Section 78 terminates in a generally vertically extending flange 75. Vertical section 76 which may be considered a front wall includes a partial side wall 82 extending therefrom. A wall similar to wall 82 (not shown) extends from the opposite end of section 76. Walls 82 include a generally semi-circular end portion.

Member 64 includes a generally vertically extending section 86 which is parallel to and spaced from section 76 of member 62. Attached to the lower end of section 86 is a generally horizontally extending section 88. Section 88 is parallel to and spaced from section 78 of member 62. Sidewalls 80 and 84 extend from the ends of section 86 and combine with walls 82 to form the side walls of the enclosure. Walls 80 and 84 have notches 85 and 87 formed respectively therein. The notches combine with the semi-circular end of each of the walls 82 to accomodate tube 48. Member 76 includes downwardly extending tabs 66 and 68 which pass through slots 70 and 72 formed in member 88. The combination of the tabs and slots enable portions 62 and 64 to be readily joined. Flanges 74 and 75 are placed in facing relation and a suitable connector is inserted through slot 89 in flange 74 to join the two flanges together. The thus formed enclosure 60 encapsulates hot water generating tube 48.

Walls 76, 78, 86 and 88 form the top, bottom, front and rear walls of the enclosure and are spaced from the surface of hot water tube 48. The only contact points between the tube and the enclosure are at the ends where the tube passes through the side walls defined by portions 82, 80 and 84. The foregoing maintains the contact area between the outer surface of tube 48 and the walls of enclosure 60 at a minimum. This results in the heat developed by the generator being maintained, for the most part, within the enclosure. By retaining the heat within enclosure 60, other parts of the coffeemaker are not subjected to such heat which will prolong their effective operating life. Further, since thermostat 56 senses the temperature of the hot water generator, the thermostat will remain open for a longer period of time before reclosing if heat is retained within the enclosure rather than emitted via radiation, convection and conduction to other components of the coffeemaker. This is of particular importance in coffeemakers of the type disclosed in the present application which utilize a separate heater to warm the coffee delivered into the carafe.

Referring now to FIGS. 2 and 8-11, it will be noted that reservoir 90 is inserted into a compartment 29 formed at the front of coffeemaker 10 and within housing 19. Reservoir 90 is removable from compartment 29. The reservoir includes sidewall 96, top wall 92 and front wall 98. Top wall 92 includes a generally rectangularly shaped opening 94 through which water can be delivered when it is desired to brew coffee. Front wall 98 is concave shaped and includes an integrally molded handle 100. The concave shape of wall 98 enables the user to comfortably grasp handle 100 for maneuvering the reservoir to and from the source of water such as a kitchen faucet. The foregoing is particularly advantageous when the reservoir has been filled with water and is somewhat heavy and cumbersome to transport.

The top front face 99 of housing 19 includes a rectangularly shaped slot 104. Reservoir 90 includes a depressible latch 102. Latch 102 includes a latch button 103 and a return spring 105. As shown specifically in FIGS. 10 and 11, latch button 103 is urged upwardly by a force provided by spring 105. Button 103 has a pair of spaced spring fingers 107 which maintains latch 102 in compartment 101A defined by flange 101. A vertically extending rib 109 insures that fingers 107 are forced outwardly in compartment 101A.

Slot 104 has a downwardly extending finger or rib 106 provided at its forward end in the path of movement of latch 102 as reservoir 90 is inserted into compartment 91. Latch button 103 engages finger 106 and is depressed thereby to enable the reservoir to be inserted within the compartment. After the latch moves forwardly out of engagement with finger 104, the latch is urged upwardly by spring 105.

When the user desires to remove reservoir 90 from compartment 29, the user depresses latch button 103 to compress spring 105. The foregoing lowers latch 102 beneath finger 106 to enable the user to withdraw reservoir 90 from compartment 29.

Resistance heater 58 for hot water generator 46 may deliver anywhere from 800 to 1000 watts to heat the water flowing through tube 48. Some models of coffeemakers utilize the same heater for heating the hot water to also maintain the temperature of the brewed coffee in the carafe at a desired temperature for a period of time after the coffee has been brewed. The heat developed by an 800-1000 watt heater far exceeds the heat necessary to maintain the temperature of the coffee in a carafe at a satisfactory level for consumption purposes.

Some models of present day coffeemakers utilize a separate heater, for example 50 to 80 watts, for maintaining the temperature of the coffee in the carafe at the desired level, known as a "keeps warm" heater. However, even the use of a separate heater for the "keep warm" function has not been totally satisfactory, particularly when used with coffeemakers having the capability to brew greater or lesser amounts of coffee, e.g. one to four cups and five to ten cups.

Figure 12:
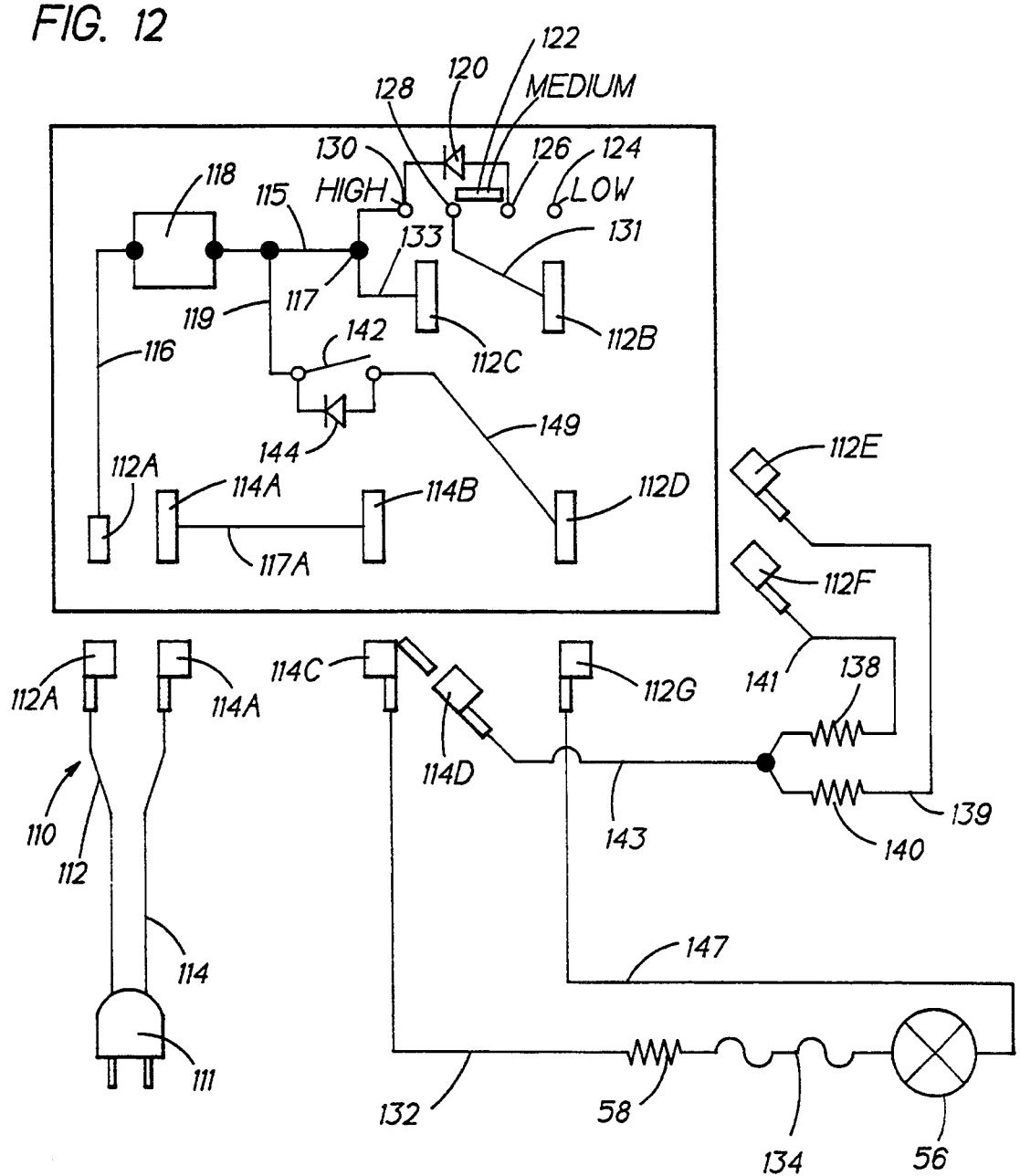
FIG. 12 is a schematic illustration of a first embodiment of a control for the heating elements of the coffeemaker.

Referring now to FIG. 12, there is schematically disclosed a first embodiment of a control for adjusting the heat generated by the "keep warm" heater so that it is compatible with the quantity of coffee retained in the carafe or variable to suit the particular tastes of a consumer.

Control 110 is connected to a suitable source of power represented by lines 112 and 114 via electrical plug 111. Line 112 is the "hot" line 0 and line 114 is the "neutral" line. Electrical power flows through line 112 to terminal 112A and then through conductor 116 to main power switch 118. If switch 118 is closed electricity flows through conductor 115 to junction 117. Conductor 115 is electrically connected to conductor 130 which, in turn, is connected to diode 120. Diode 120 is electrically connected to terminal 126 of switch 122. Switch 122 further includes terminals 124, 128 and 130. When switch 122 is placed across terminals 124 and 126, the flow of electricity is interrupted. When switch 122 is placed across terminals 126 and 128, current is supplied via conductor 131 to terminal 112B. If switch 122 is placed across terminals 128 and 130, diode 120 is shunted and electricity flows directly from conduit 115 to terminal 112B.

Electrical power also flows from junction 117 through conductor 133 to terminal 112C. Terminal 112C is in continuous electrical connection with terminal 112F. Terminal 112E is in electrical contact with terminal 112B. Terminal 112E is electrically connected through conductor 139 to electrical heater 140. Terminal 112F is electrically connected through conductor 141 to heater 138. Heaters 138 and 140 are electrically connected in parallel. In turn the heaters are electrically connected via conductor 143 to neutral terminal 114D which, in turn, is connected to neutral terminal 114C. Terminal 114C is electrically connected to terminals 114B and 114A to complete the electrical circuit. Conductor 117A connects terminals 114A and B.

Terminal 112G is electrically connected to terminal 112D. Conductor 119 is electrically connected to conductor 115. Conductor 119 is connected to conductor 149 through a parallel circuit alternatively comprising normally open switch 142 or diode 144. In turn, terminal 112G is connected via conduit 147 to thermostat 56, a thermal overload fuse 134 and hot water generator heater 58. Heater 58 is connected to neutral terminal 114C via conduit 132. Neutral terminal 114C is connected to terminals 114B and 114A to complete the electrical circuit.

In use, when the user desires to brew coffee, and with reference to the control disclosed in FIG. 12, the user connects cord 111 to the source of electrical power and closes switch 118. Electrical power flows through conduits 112, 116, and 118 to junction 117. If the user is brewing a relatively full pot of coffee, switch 142 is closed and electrical power is supplied via conduit 119, switch 142 and conduit 149 to terminal 112C. Power then flows through terminal 112G, thermostat 56, thermal overload protector 134 to heater 58 which generates the heat to raise the temperature of the water passing through hot water generator 46 to a desired temperature level.

If the user is brewing a lesser batch of coffee, for example one to four cups, then switch 142 is maintained open and electrical power flows through diode 144 which provides half wave rectification. The half wave rectified electrical power flows through conduit 149 to terminal 112C and thereafter passes to heater 58. If heater 58 is rated at 900 watts under full power, its rating when diode 144 is in the circuit is approximately one half that or 450 watts.

Once the coffee has been brewed, the user may not immediately drink all the coffee and thus coffee remains in the carafe to be kept warm by the "keep warm" heater. In the preferred embodiment heater 138 is rated at 52 watts and heater 140 is rated at 28 watts.

If a relatively small quantity of coffee remains to be warmed in the carafe, the user moves switch 122 to the low position. With switch 122 connected across the terminals 124 and 126, heater 140 is effectively removed from the electrical power circuit. Thus, only heater 138 operates to provide heat for the "keep warm" function.

However, if a greater quantity of heat is required due to the quantity of coffee in the carafe being at a higher level, then the user may opt to place switch 122 in either the medium or high positions. If switch 122 is placed in its medium position, it is placed across terminals 126 and 128 as illustrated in FIG. 12. In this position, the electrical power flows through diode 120 and thence through terminals 126 and 128 to heater 140. Diode 120 effectively reduces the rated wattage, for example 28 watts, in half. If heater 138 is rated at 52 watts and heater 140 rated at 28 watts then the total wattage output when diode 120 is in the circuit is approximately 66 watts.

Finally, if the user desires the maximum level of heat for the "keep warm" function, switch 122 is placed in its high position whereby the switch connects terminals 128 and 130. In this position, diode 120 is effectively removed from the circuit and full wave voltage supply is furnished to heater 140. Current flows through contacts 130 and 128, 112B and 112E to heater 140. Further, electrical power is furnished to heater 138 through contacts 112D and 112F. The fully rated wattage for example 80 watts is used for the "keep warm" function.

Figure 13:
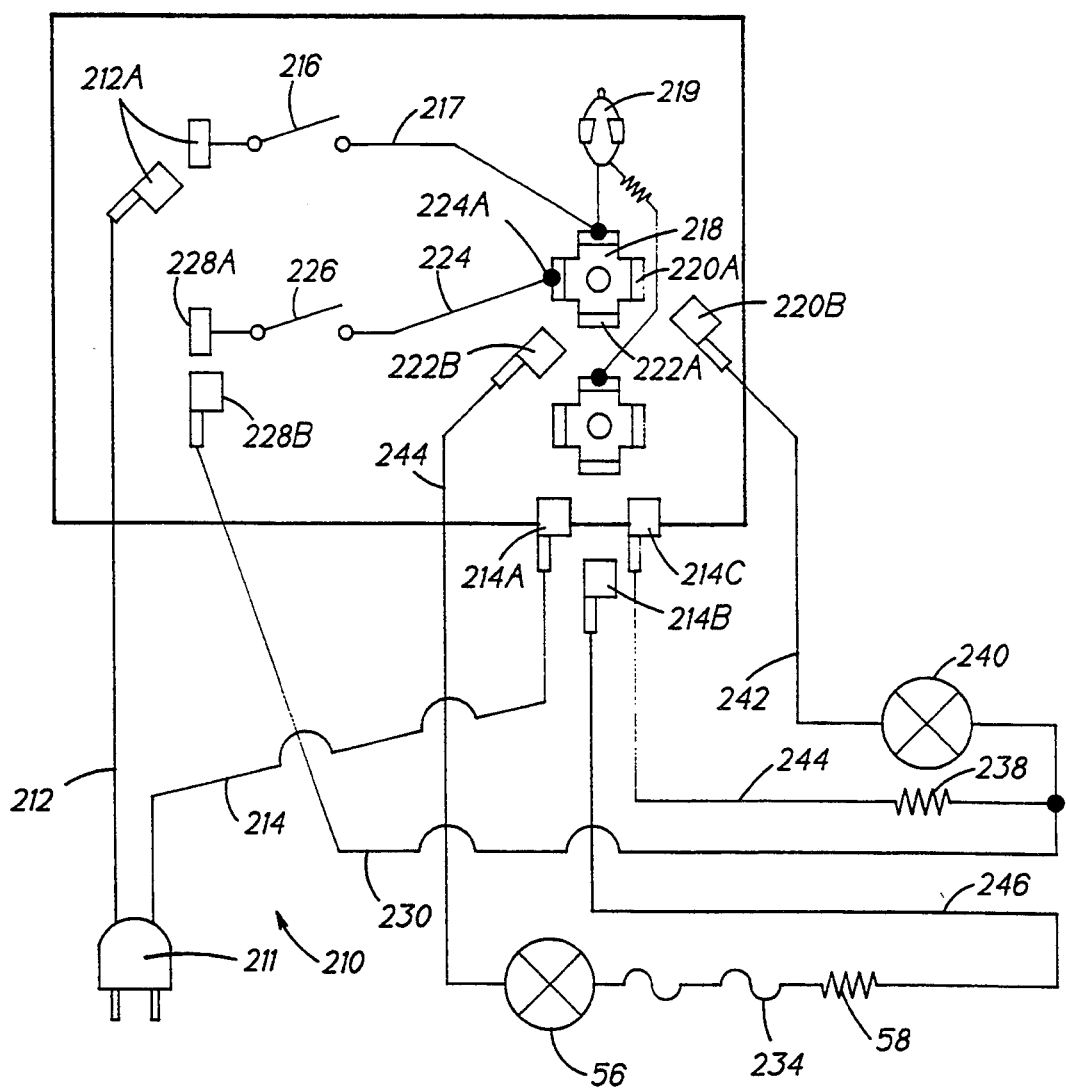
FIG. 13 is a schematic view of a second embodiment of the control.

Referring now to FIG. 13, there is disclosed an alternative embodiment to the control described in FIG. 12 for regulating the operation of the "keep warm" function.

Control 210 includes conductors 212 and 214 which are connected to a source of electrical power via supply cord 211. Conductor 212 is labeled the "hot" line and conductor 214 is labeled the "neutral" line. Conductor 212 delivers electrical power to terminals 212A which, in turn, provides power to main power switch 216. When closed, switch 216 delivers electrical power via conductor 217 to buss 218.

Buss 218 is electrically connected to a light 219, which when lit, indicates that electrical power is furnished to the coffeemaker. Buss 218 is also electrically connected to terminals 220A, 222A, and 224A. Terminal 220A in turn is connected to terminal 220B; terminal 222A is connected to 222B and terminal 224A is connected to conductor 224 and to normally open switch 226.

Terminal 220B is connected via conductor 242 to a thermostat 240 and a "keep warm" heater 238. In the preferred embodiment heater 238 is rated at 80 watts. Heater 238 is connected via conductor 244 to terminal 214C which is a neutral terminal connected to terminal 214A and conductor 214.

Switch 226 is connected to terminals 228 and 228B and then via conductor 230 to heater 238. Thus, electrical power is alternatively delivered to heater 238 via the circuitry associated respectively with conductors 230 and/or 242.

Terminal 222A is connected to terminal 222B and then via conductor 244 to thermostat 56, thermal overload protector 234, hot water generator heater 58 and conductor 246 to neutral terminal 214B. Terminal 214B, in turn, is connected to terminal 214A and neutral conductor 214.

In operation, when switch 216 is closed, electrical power is delivered via conductors 212 and 214 to buss 218. Buss 218 provides electrical power to conductor 244 through terminals 222A and 222B. Electrical power is then delivered to hot water generator 58 to provide hot water for brewing process.

Further, when it is desired to utilize the "keep warm" function, switch 226 may either be closed or open. If switch 226 is open, power is delivered from buss 218 through terminals 220A and 220B to thermostat 240 and thence to heater 238. Thermostat 240 can be set at a selected temperature. Thermostat 240 senses the temperature at base 20 and may be set to obtain a lower temperature when a lesser quantity of coffee remains in the carafe or a selectable lower temperature to satisfy the individual taste of a consumer. The contacts of thermostat 240 will open when the sensed temperature at base 20 reaches the predetermined level to discontinue operation of heater 238.

If maximum heat is desired for the "keep warm" function as a consequence of the carafe being relatively filled with coffee, switch 226 is closed. Electrical power is then delivered through terminals 228A and 228B, and conductor 230 to heater 238. The wattage available from the heater will then be continuously delivered for the "keep warm" function. Thermostat 240 is effectively shorted from the circuit.

With either of the two controls described above, operation of the "keep warm" heater is selectively controlled so that the heat generated by the heater is compatible with the quantity of coffee remaining in the carafe for which the "keep warm" function is required.

While preferred embodiments of the present invention have been described and illustrated, the invention should not be limited thereto but may be otherwise embodied within the scope of the following claims.

What is claimed is:

1. A coffeemaker comprising;
   a housing;
   a water reservoir contained within the housing;
   a carafe supported on a base portion of said housing;
   a spreader mounted within said housing; and
   a hot water generator having an inlet conduit connected to the water reservoir and an outlet conduit connected to the spreader, said hot water generator having a generally shallow V-shape, said hot water generator having an inlet end connected to said inlet conduit and an outlet end connected to said outlet conduit and a longitudinally extending central portion, the longitudinal center of said central portion being disposed vertically belows aid inlet and outlet ends.

2. A coffeemaker in accordance with claim 1 further including an enclosure supported within the housing and surrounding said hot water generator, the contact area between the surfaces of said enclosure and said hot water generator being relatively minimal, with the major portion of the surfaces of said enclosure and said hot water generator being spaced from each other to form an insulating air barrier to retain the heat generated by the hot water generator within the enclosure.

3. A coffeemaker in accordance with claim 2 further including a temperature sensing device mounted between an outer wall of said hot water generator and an inner wall of said enclosure.

4. A coffeemaker comprising:
   a housing;
   a water reservoir contained within the housing;
   a carafe supported on a base portion of said housing;
   a spreader mounted within said housing;
   a hot water generator having an inlet conduit connected to the water reservoir and an outlet conduit connected to the spreader; and
   an enclosure supported within the housing and surrounding said hot water generator, the contact area between the surfaces of said enclosure and said hot water generator being relatively minimal, with the major portion of the surfaces of said enclosure and said hot water generator being spaced from each other to form an insulating air barrier to retain the heat generated by the hot water generator within the enclosure.

5. A coffeemaker in accordance with claim 4 further including:
   a temperature sensing device mounted between an outer wall of said hot water generator and an inner wall of said enclosure.

* * * * *